(12) United States Patent
Bast et al.

(10) Patent No.: US 10,814,852 B2
(45) Date of Patent: Oct. 27, 2020

(54) TECHNIQUE FOR CHARACTERIZING AN ELECTROMECHANICAL ACTUATOR UNIT FOR A VEHICLE BRAKE

(71) Applicant: Lucas Automotive GmbH, Koblenz (DE)

(72) Inventors: Michael Bast, Bendorf (DE); Benedikt Ohlig, Vallendar (DE); Steve Scherer, Bilkheim (DE); Thomas Puetz, Naunheim (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 16/328,071

(22) PCT Filed: Aug. 23, 2017

(86) PCT No.: PCT/EP2017/071190
§ 371 (c)(1),
(2) Date: Feb. 25, 2019

(87) PCT Pub. No.: WO2018/046296
PCT Pub. Date: Mar. 15, 2018

(65) Prior Publication Data
US 2019/0217836 A1    Jul. 18, 2019

(30) Foreign Application Priority Data
Sep. 8, 2016   (DE) .......................... 10 2016 010 815

(51) Int. Cl.
*B60T 13/66*       (2006.01)
*B60T 7/04*        (2006.01)
(Continued)

(52) U.S. Cl.
CPC .............. *B60T 13/66* (2013.01); *B60T 7/042* (2013.01); *B60T 13/74* (2013.01); *B60T 13/741* (2013.01);
(Continued)

(58) Field of Classification Search
CPC ........ B60T 13/66; B60T 13/74; B60T 13/741; B60T 17/18; B60T 17/22; B60T 17/221; B60T 17/223; B60T 7/042
See application file for complete search history.

(56) References Cited

U.S. PATENT DOCUMENTS 6,774,595 B1   8/2004 Laxhuber et al.
7,227,324 B2   6/2007 Erben et al.
(Continued)

FOREIGN PATENT DOCUMENTS

DE          10361042 B3   5/2005
DE       102005024834 B3   1/2007
(Continued)

OTHER PUBLICATIONS

International Search Report, Application No. PCT/EP2017/071190, dated Dec. 1, 2017.
(Continued)

*Primary Examiner* — Vishal R Sahni
(74) *Attorney, Agent, or Firm* — Gigette M. Bejin

(57) ABSTRACT

A method for characterizing an electromechanical actuator unit for a vehicle brake, the electromechanical actuator unit comprising an electric motor and an actuator coupled to the electric motor. The actuator can be moved over a first area of movement without generation of a brake force and over a second area of movement with modification of a brake force. The method is carried out when the actuator moves within the first area of movement, and comprises the following steps: a) a voltage applied to the electric motor is
(Continued)

interrupted, b) at least one parameter is determined while the electric motor runs in the generator mode, and c) at least one value is determined for a motor constant of the electric motor on the basis of the at least one parameter. The invention also relates to a vehicle brake, as well as to a computer program and a control unit for implementing the method.

12 Claims, 6 Drawing Sheets

(51) Int. Cl.
  *B60T 13/74* (2006.01)
  *B60T 17/22* (2006.01)
  *B60T 17/18* (2006.01)
(52) U.S. Cl.
  CPC .............. *B60T 17/18* (2013.01); *B60T 17/22* (2013.01); *B60T 17/221* (2013.01); *B60T 17/223* (2013.01)

(56) References Cited

U.S. PATENT DOCUMENTS

| | | | |
|---|---|---|---|
| 9,156,459 B2 | 10/2015 | Knechtges et al. | |
| 9,643,583 B2 | 5/2017 | Baehrle-Miller et al. | |
| 9,643,586 B2 | 5/2017 | Blattert et al. | |
| 9,789,863 B2 | 10/2017 | Straub et al. | |
| 9,829,058 B2 | 11/2017 | Holder et al. | |
| 9,919,691 B2 | 3/2018 | Ohlig et al. | |
| 2015/0066324 A1* | 3/2015 | Baehrle-Miller | B60T 13/662 701/70 |
| 2015/0239439 A1* | 8/2015 | Sussek | B60T 8/171 701/70 |
| 2016/0025169 A1* | 1/2016 | Holder | F16D 65/18 188/162 |
| 2017/0088111 A1* | 3/2017 | Kirchner | B60T 1/005 |

FOREIGN PATENT DOCUMENTS

| | | |
|---|---|---|
| DE | 102010033254 A1 | 2/2012 |
| DE | 102011016126 A1 | 10/2012 |
| DE | 10211078900 A1 | 1/2013 |
| DE | 102012205576 A1 | 10/2013 |
| DE | 102014002484 A1 | 8/2015 |
| DE | 102014202173 A1 | 8/2015 |
| DE | 102014214741 A1 | 2/2016 |
| WO | 0105638 A1 | 1/2001 |
| WO | 2010136234 A1 | 12/2010 |
| WO | 2012079802 A2 | 6/2012 |

OTHER PUBLICATIONS

International Preliminary Report on Patentability, Application No. PCT/EP2017/071190, dated Aug. 3, 2018.

* cited by examiner

Fig. 4

| S0: Determination of a no-load current of the electric motor |

| S1: Switching off of the voltage applied to the electric motor |

| S21: Determination of a first value for a voltage induced in the electric motor at a first time |

| S23: Determination of a first value for a speed of the electric motor, which is associated with the voltage induced in the electric motor at the first time |

| S31: Determination of a value of the motor constant by means of the first value for the induced voltage and by means of the first value for the speed |

| S25: Determination of a second value for a voltage induced in th electric motor at a second time |

| S27: Determination of a second value for a speed of the electric motor, which is associated with the voltage induced in the motor at the second time |

| S4: Switching on of the voltage applied to the electric motor |

| S33: Determination of a value of the motor constant by means of the second value for the induced voltage and by means of the second value for the speed |

| S5: Determination of the loss torque T0 |

| S35: Determination of a value for the motor constant by means of T0 and I0 |

TECHNIQUE FOR CHARACTERIZING AN ELECTROMECHANICAL ACTUATOR UNIT FOR A VEHICLE BRAKE

CROSS-REFERENCE TO RELATED APPLICATIONS

This application is a national stage of International Application No. PCT/EP2017/071190, filed 23 Aug. 2017, the disclosures of which are incorporated herein by reference in entirety, and which claimed priority to German Patent Application No. 10 2016 010 815.0, filed 8 Sep. 2016, the disclosures of which are incorporated herein by reference in entirety.

BACKGROUND TO THE INVENTION

The present invention relates generally to the technical field of electromechanical actuator units and in particular to electromechanical actuator units for a vehicle brake. More precisely, the present disclosure relates to a method for characterizing an electromechanical actuator unit for a vehicle brake, which electromechanical actuator unit has an electric motor and an actuator coupled to the electric motor. The present disclosure further relates to a vehicle brake with a control unit for executing such a method and to a computer program product and a control unit for this.

Vehicle brakes which have an electromechanical actuator unit with an electric motor and an actuator coupled to the electric motor are known, for example, from the field of electromechanical parking brakes. On activation of the parking brake, in particular by pressing a button, elements of the actuator are moved by the electric motor along a displacement axis. In a first movement range of the actuator along the displacement axis, no change in the brake force occurs on application of the brake. In this movement range, all existing gaps, like the gaps between the brake disc and the brake pads and between the actuator and the base of an actuating piston acting on the brake pad are passed. After passing all existing gaps, in a further movement of the actuator along the displacement axis in a second movement range, the brake force is changed by application of the brake pads to the brake disc and an elastic deformation of the brake pads.

On attaining the desired brake force, the movement of the actuator is stopped by turning off the electric motor. The brake force attained can be determined indirectly by means of various measured quantities and model sizes. To avoid overloading the electromechanical actuator unit, it is important that the brake force attained is determined as precisely as possible.

From WO 2012/079802 A1 a method is disclosed for adjusting the clamping force applied by a parking brake, in which method the total resistance in the electromotive brake device is determined to determine the clamping force to be provided by the electromotive brake device.

From WO 01/05638 A1 a method is known for monitoring a brake-applying electromechanical device for vehicle brakes, in which method the generator effect arising at the electric motor on engagement of the parking brake is utilized for monitoring.

It is known from DE 10 2012 205 576 A1 to determine the motor constant for determining the clamping force produced by a parking brake by measuring the motor current and the motor voltage during actuation of the brake motor.

SUMMARY OF THE INVENTION

A technique for characterizing an electromechanical actuator unit for a vehicle brake and a vehicle brake are to be specified, which permit a precise determination of the brake force attained by means of the electromechanical actuator unit.

According to a method for characterizing an electromechanical actuator unit for a vehicle brake, wherein the electromechanical actuator unit has an electric motor and an actuator coupled to the electric motor, the actuator can be moved over a first movement range without generating a brake force and over a second movement range with modification of a brake force. The method is implemented on movement of the actuator within the first movement range. The method comprises the following steps:

a) switching off a voltage applied to the electric motor,
b) determination of at least one parameter while the electric motor is running in generator mode, and
c) determination of at least one value for a motor constant of the electric motor by means of the at least one parameter.

The vehicle brake can have a parking brake. The parking brake typically has a parking brake unit, which can move along a displacement axis. The parking brake unit can comprise an actuator, which is formed as a nut/spindle arrangement. In such a nut/spindle arrangement, the actuator comprises a spindle nut, which is movable by rotation of a spindle in a translatory manner along the displacement axis. The translation movement of the spindle nut causes a translation movement of an actuating piston likewise along the displacement axis. The movement of the actuating piston causes friction linings to be brought into abutment with a brake disc, and a brake force is generated. It is important here that the brake force is not too small to guarantee braking of the vehicle reliably, and that the brake force is not too great, in order to avoid overloading.

The electric motor can be part of an electromotive drive or transmission unit. The electric motor is coupled to the actuator by means of the transmission unit. The electromotive drive or transmission unit and the actuator are part of the electromechanical actuator unit.

The vehicle brake can further comprise a service brake. The service brake is activated if a hydraulic pressure is built up in a hydraulic chamber in which the actuating piston is located. The actuating piston is moved along the displacement axis by the hydraulic pressure, and as in the parking brake process, a brake force is achieved thereby by application of the friction linings to the brake disc.

Furthermore, the vehicle brake can have a control unit, which is adapted to cause the vehicle brake to implement the method disclosed.

Before a brake force is achieved in the application process, several gap dimensions must be bridged by the movement of the actuating piston. The gap dimensions include the gaps on both sides of the brake disc between the brake disc and the respective friction lining, a gap between the friction lining facing the actuating piston and the actuating piston itself, and a gap between the spindle nut and the actuating piston.

A movement of the spindle nut or of the actuating piston in a range in which the gap dimensions are bridged and no brake force is generated is defined as a movement in a first movement range, and a movement of the spindle nut or of the actuating piston in a range in which the friction linings abut the brake disc, so that the brake force is modified, is defined as a movement in a second movement range.

The disclosed method is executed, for example, when exercising the parking brake function, to be precise during the movement of the actuator in the first movement range, in which no brake force is yet generated or a brake force is no longer generated, as a function of whether the method is implemented when applying the brake or when releasing the brake. The method can therefore be implemented both when applying the parking brake, thus in a movement from the first movement range into the second movement range, and when releasing the brake, thus in a movement from the second movement range into the first movement range, within the first movement range.

The determination of the at least one parameter takes place after switching off the voltage applied to the electric motor, when no further motor current flows, in the generator mode of the electric motor.

In the disclosed method, the at least one parameter can be determined directly by measurement. It can also be determined by measurement of one or more other parameters representative of the at least one parameter and subsequent calculation with use of the at least one parameter. Since the motor constant is subsequently determined by means of this at least one parameter, the temperature dependence of the motor constant and the variation on account of manufacturing tolerances are taken into account in the determined value for the motor constant.

The motor constant determined by this method can be used as a starting point for determining other quantities characterizing the electromechanical actuator unit, such as the axial force of the spindle nut, for example. Since the determined value for the motor constant is more accurate than previously known values for the electric motor for the motor constant, in which no manufacturing tolerances are taken into account and which vary according to the motor temperature, the other quantities characterizing the electromechanical actuator unit are also more accurate than if they had been determined on the basis of one of the previously known values for the motor constant.

In the disclosed method, the voltage applied to the electric motor can be switched on again after a predetermined period, typically after 10 or 30 to 50 or 100 ms. This means that according to the method disclosed, the application process or the release process of the brake is only briefly interrupted, in order to determine the at least one parameter, and then is executed further as usual. The interruption is so brief that it is not noticeable for the vehicle driver. The electric motor is in particular switched on after the at least one parameter has been determined and before the value for the motor constant is determined.

In a variant of the disclosed method, the no-load current of the electric motor is determined, to be precise before switching off the voltage applied to the electric motor. The no-load current can be used to determine a loss torque of the electromechanical actuator unit, for example.

According to one embodiment, step b) comprises the following steps:
determination of a first value for a voltage induced in the electric motor at a first time, and
determination of a second value for a voltage induced in the electric motor at a second time.

In step c), the determined value for the motor constant is then determined by means of the no-load current, a difference between the first value and the second value for the voltage induced in the electric motor and the mass inertia of the electromechanical actuator unit.

In this embodiment, the motor constant is determined without knowledge of the motor speed, by means of two different values for the induced voltage at two different times, to be precise respectively when no further motor current flows. Since the voltage is measured in the currentless state, no measuring errors on account of different line resistances and internal motor resistances occur. A typical time span between the first time and the second time is approx. 20 ms. A typical difference between the first value and the second value for the voltage induced in the electric motor is between 0.4 and 0.5 V.

In one variant of the embodiment, a loss torque of the electromechanical actuator unit is determined by means of the no-load current, the difference between the first value and the second value for the voltage induced in the electric motor and the mass inertia of the electromechanical actuator unit. The mass inertia of the electromechanical actuator unit is a known quantity. The no-load current was determined in a variant at the beginning of the method, and the differential value of the induced voltage results from the parameters measured in step b). Using the loss torques determined over the service life of the electromechanical actuator unit, the actuator status can be monitored, in particular with knowledge of the electric motor temperature. In particular, wear states of the electromechanical actuator unit can be determined from this.

According to another embodiment, step b) comprises the following steps:
determination of a first value for a voltage induced in the electric motor at a first time,
determination of a first value for a speed of the electric motor, which value is associated with the voltage induced in the electric motor at the first time.

In the other embodiment of the disclosed method, as well as a value for the induced voltage following switching off of the electric motor voltage, when no further current flows, a value is therefore determined for a speed of the electric motor. Since the voltage is measured in the currentless state as in the embodiment described above, no measuring errors on account of different line resistances and internal motor resistances occur here either. The speed can be determined by a model or by measurement, for example by means of a ripple detector or a speed sensor.

Using the first value for the speed of the electric motor and the first value for the voltage induced in the electric motor, a value can then be determined for the motor constant. As explained above, the temperature dependence of the motor constant and deviations from a previously known value on account of manufacturing tolerances are taken into account in this value.

A further development provides that step b) further comprises the following steps:
determination of a second value for the voltage induced in the electric motor at a second time, and
determination of a second value for the speed of the electric motor, which value is associated with the voltage induced in the electric motor at the second time.

These steps also are implemented after switching off the electric motor voltage, when no further current flows, so that the voltage is measured here, too, in the currentless state, due to which no measuring errors on account of different line resistances and internal motor resistances occur here either. The speed can also be determined by a model or by measurement, for example by means of a ripple detector or a speed sensor. A typical time span between the first time and the second time is approx. 20 ms.

The values determined in the above development can be used to determine a second value for the motor constant by means of the second value for the speed of the electric motor and by means of the second value for the voltage induced in the electric motor. The second value for the motor constant can be used for verification of the first value for the motor constant.

The values determined in the above development can be used in addition or alternatively to determine a value for a loss torque of the electromechanical actuator unit by means of a difference between the first value and the second value for the speed of the electric motor and the mass inertia of the electromechanical actuator unit.

A typical difference between the first value and the second value for the speed of the electric motor is approx. 40 rad/s. The mass inertia of the electromechanical actuator unit is a known value. Using the loss torques determined over the service life of the electromechanical actuator unit, the actuator status can be monitored, in particular with knowledge of the electric motor temperature. In particular, wear states of the electromechanical actuator unit can be determined from this.

According to one variant, the loss torque, and a no-load current determined at the beginning, can be used to determine another value for the motor constant. The value thus determined can follow in addition to the determination by means of induced voltage and speed for verification of the value or values determined before this. However, it can also follow alternatively to the determination by means of induced voltage and speed.

In a variant of both embodiments, the temperature of the electric motor is determined by comparison of the determined value for the motor constant with known reference values for the motor constant, which are each associated with a certain temperature. This represents a simple option for determining the temperature of the electric motor without additional sensors. The reference values can be stored in a memory unit of the vehicle brake. If several values were determined in the context of a switch-off process, the determined value of the motor constant can be one of the values or a mean value of the values, for example.

In another variant of both embodiments, a motor current is determined at which a predetermined brake force is attained, to be precise by means of the determined value for the motor constant. If several values were determined in the context of a switch-off process, the determined value of the motor constant can be one of the values or a mean value of the values, for example, here too. In particular, the axial force of the spindle nut can be calculated on the basis of the determined value. It is thus possible to determine the current at which the electric motor is to be switched off when the desired clamping force or axial force is attained. Since the determined value for the motor constant contains variations on account of manufacturing tolerances and temperature influences, a more precise axial force setting is possible than when using a known characteristic motor value. This leads to smaller overloads and thus a longer transmission service life.

There is further provided a vehicle brake, which comprises an electromechanical actuator unit with an electric motor and an actuator coupled to the electric motor, which actuator can be moved over a first movement range without generation of a brake force and over a second movement range with modification of a brake force, and a control unit, which is adapted to cause the vehicle brake to implement the disclosed method according to one of the preceding embodiments and aspects.

To do this, the vehicle brake can comprise or provide any of the aforesaid components, features and/or functions in order to realize the method according to one of the preceding aspects. This relates in particular to a controller, an electric motor and/or an actuator unit as well as suitable sensor devices for determining the operating parameters of the electromechanical actuator unit and parking brake unit.

There is further provided a computer program product, which comprises program code means, in order to implement a method with the steps according to one of the preceding embodiments and aspects upon execution of the computer program product on a processor.

Finally, there is provided a control unit for a vehicle brake, which unit comprises a processor and the aforesaid computer program product. The control unit and the vehicle brake can be integrated to give a brake system.

Other advantages of this invention will become apparent to those skilled in the art from the following detailed description of the preferred embodiments, when read in light of the accompanying drawings.

BRIEF DESCRIPTION OF THE DRAWINGS

FIG. 4 shows schematically the method sequence of a variant of the embodiment of the disclosed method shown in FIG. 3;

DETAILED DESCRIPTION OF THE INVENTION

Figure 1:
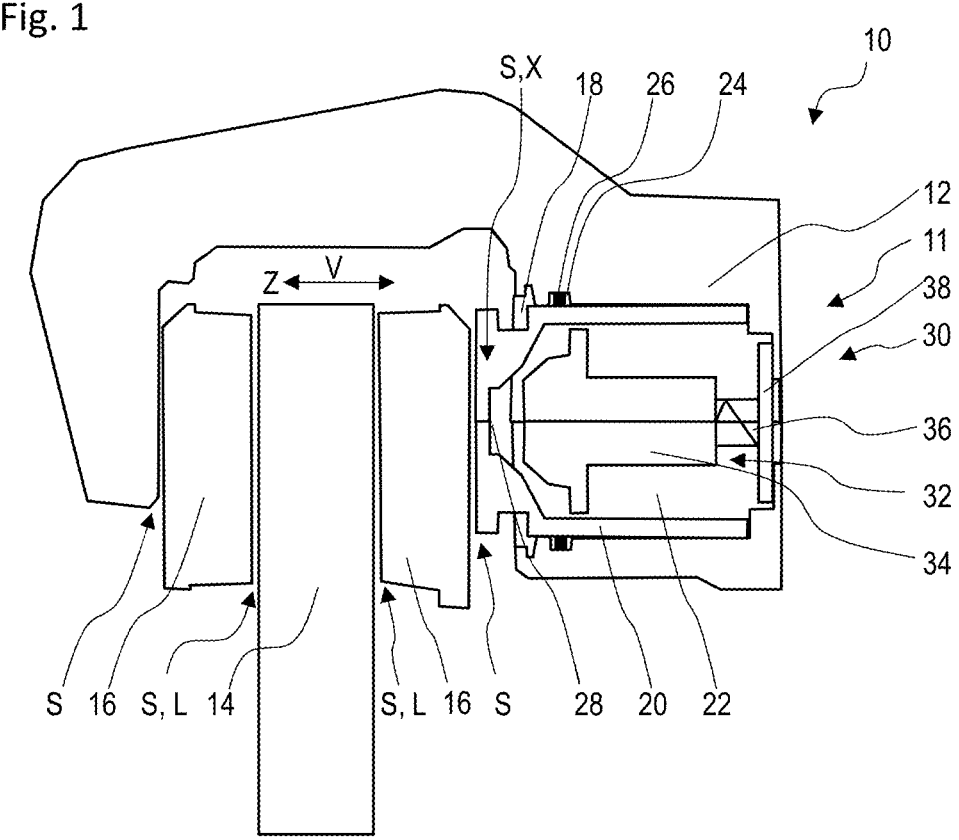
FIG. 1 shows a schematic view of a vehicle brake for implementing a method for characterizing an electromechanical actuator unit.

In FIG. 1 there is shown a vehicle brake 10 for implementing the disclosed method. The vehicle brake 10 is formed in a mechanical respect as a generally known sliding caliper brake, wherein only selected components of the vehicle brake 10 are depicted.

The vehicle brake 10 comprises a brake housing 12 in the form of a known brake caliper and a brake disc 14 coupled in a torque-proof manner to a vehicle wheel (not depicted). Lying opposite the brake disc 14 on both sides are friction linings 16, which can be brought into abutment with the brake disc 14 to achieve a brake force.

The vehicle brake 10 further comprises a service brake 11 with a displaceable actuating piston 20 taken up in a bore 18 in the brake housing 12. This piston is formed as a hollow piston and together with the bore 18 delimits a hydraulic chamber 22. By the introduction and draining of hydraulic fluid in the hydraulic chamber 22, a hydraulic pressure can be built up and dissipated in the chamber 22 and the actuating piston 20 can be moved along a displacement axis V. A movement along the displacement axis V in FIG. 1 to the left corresponds in this case to a movement in an application direction Z. Due to movement in the application direction Z, the friction linings 16 can be brought into abutment with the brake disc 14 to achieve a brake force and on dissipation of the hydraulic pressure are released from this again, in order to guarantee the service brake function.

To achieve the desired return movement of the actuating piston 20 into its starting position following dissipation of the hydraulic pressure, the vehicle brake 12 further comprises a seal 24, which is depicted in a schematic manner.

The seal 24 is taken up in a groove 26 starting out from the bore 18 and abuts an outer wall of the actuating piston 20. The seal 24 provides in a generally known manner a so-called "rollback" function, which acts in support to push the actuating piston 20 back into its starting position on dissipation of the hydraulic pressure.

The vehicle brake 10 further has in the hydraulic chamber 22 a parking brake unit 30, which can likewise move along the displacement axis V. The parking brake unit 30 comprises an actuator 32, which is formed as a nut/spindle arrangement. More precisely, the actuator 32 comprises a spindle nut 34, which can be moved by rotation of a spindle 36 in a translatory manner along the displacement axis V. In this process the spindle nut 34 can also be brought into abutment with a piston base 28, which is formed as an inner end wall region of the actuating piston 20 lying opposite the spindle nut 34 and delimiting the hydraulic chamber 22.

The actuator 32 is further connected via a coupling region 38 to the brake housing 12, wherein an electromotive drive and transmission unit, which is not depicted separately, is flanged from the outside onto the brake housing 12 at the coupling region 38. The electromotive drive and transmission unit has an electric motor, which is coupled by means of a transmission unit to the actuator 32. In particular, the transmission unit is coupled on the drive side to a drive shaft of the electric motor and on the output side to a pin coupled to the spindle 36 of the actuator 32. The electromotive drive unit drives the spindle 36 rotationally, in order to achieve the desired translatory displacement movement of the spindle nut 34 along the axis V. The electromotive drive and transmission unit and the actuator 32 form an electromechanical actuator unit.

The disclosed vehicle brake 10 further comprises a control unit, not depicted, which comprises a processor and a computer program product, wherein the control unit is formed to execute a method as described further below.

In FIG. 1 there are also shown the gap dimensions S present in the case of non-actuation of the service brake and the parking brake function, which dimensions have to be bridged to achieve a brake force. These relate to (from left to right in FIG. 1): a gap S between the brake housing 12 and the left friction lining 16 in FIG. 1, a gap S between the left friction lining 16 and the brake disc 14, a gap S between the right friction lining 16 in FIG. 1 and the brake disc 14 and a gap S between the actuating piston 20 and the right friction lining 16. To generate brake forces, the parking brake unit 30 must additionally overcome a gap S between the spindle nut 34 and the piston base 28 of the actuating piston 20.

The gaps S between the friction linings 16 and the brake disc 14 are termed "clearance" or "brake clearance", which is why these gaps S are additionally provided with the reference sign L. The clearance L should assume a predetermined minimum value in order to avoid residual torques in the sense of an undesirable abutment of the friction linings 16 on the brake disc 14 when the vehicle brake 10 is not actuated.

The gap S between the spindle nut 34 and the piston base 28 of the actuating piston 20 is a safety clearance, which is why this gap S is additionally provided with the reference sign X. For system safety reasons the safety clearance X assumes a predetermined minimum value in order to guarantee a proper service brake function in the case of non-actuation of the parking brake function.

In normal driver-controlled service braking, a hydraulic pressure is built up in the hydraulic chamber 22 and the actuating piston 20 is moved along the application direction Z into an actuating position generating a brake force. It comes into abutment here with the right friction lining 16, brings this into abutment with the brake disc 14 and applies the vehicle brake 10 in a known manner according to the sliding caliper design. In this process all gap dimensions S including the air gap L are bridged, with the exception of the safety clearance X between the spindle nut 34 and the piston base 28. To remove the brake force, the actuating piston 20 moves as a consequence of reducing the hydraulic pressure and with "roll-back" support by the seal 24 opposite to the application direction Z, whereupon the gap dimensions S, L previously bridged are reinstated.

The parking brake unit 30 can generally be activated in the presence or absence of a hydraulic pressure to move the actuating piston 20 into its actuation position and/or lock it there mechanically. To do this, the spindle nut 34 is moved in the manner described above along the axis V and is supported in so doing (at least in a movement in the application direction Z) on the piston base 28.

A movement of the spindle nut 34 in a range in which the gap dimensions S are bridged and no brake force is generated is defined as movement in a first movement range, and a movement of the spindle nut 34 in a range in which the friction linings 16 abut the brake disc 14, so that the brake force is modified, is defined as a movement in a second movement range.

The disclosed method is executed upon exercising the parking brake function, to be precise in a movement of the actuator 32 within the first movement range, in which no brake force is yet generated or a brake force is no longer generated, depending on whether the method is implemented when applying the brake or when releasing the brake. The method can thus be implemented both when applying the parking brake, thus in a movement from the first movement range to the second movement range, and when releasing the brake, thus in a movement from the second movement range to the first movement range, within the first movement range.

Quite generally, in the disclosed method the electric motor is briefly switched off and on again in idling, in a movement within the first movement range. While the electric motor is switched off, one or more parameters are determined in generator mode of the electric motor. The parameter or parameters determined are then used to determine a value for a motor constant of the electric motor.

Figure 2:
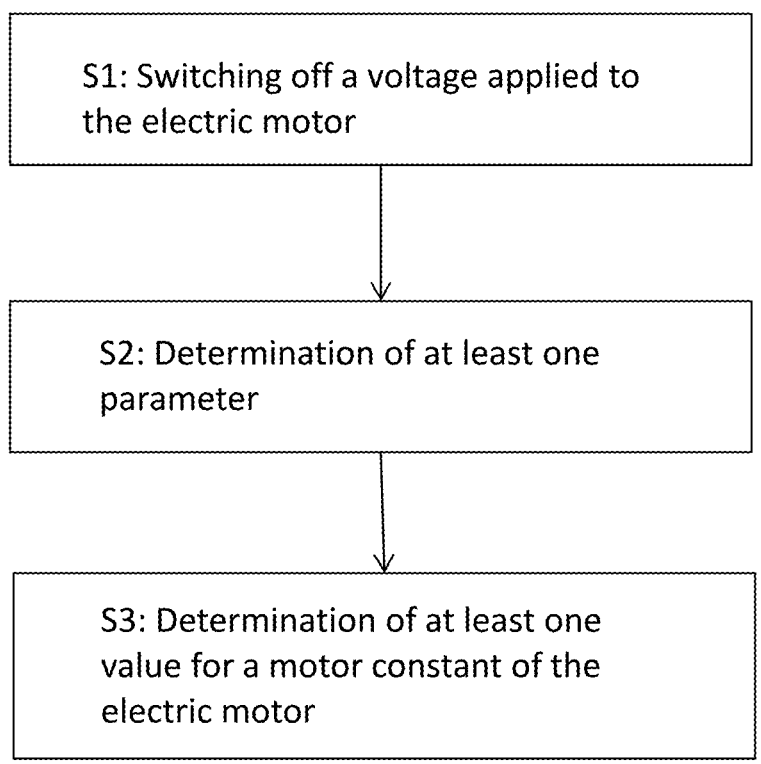
FIG. 2 shows schematically the method sequence of the disclosed method for characterizing an electromechanical actuator unit.

The sequence of the method is depicted schematically by means of FIG. 2. In a first step S1, the voltage applied to the electric motor is switched off on movement of the actuator within the first movement range. Following switching off of the voltage, at least one parameter is determined in step S2, while the electric motor continues to run with the voltage switched off. Finally, in step S3 at least one value for a motor constant of the electric motor is determined on the basis of the at least one parameter. Following step S2 (thus e.g. in step S3 or a step S4, not depicted), the voltage can then be switched on again, so that the electric motor continues running and, for example, an operating cycle that is currently in progress (applying or releasing the brake) can be continued substantially free of interruption.

Figure 3:
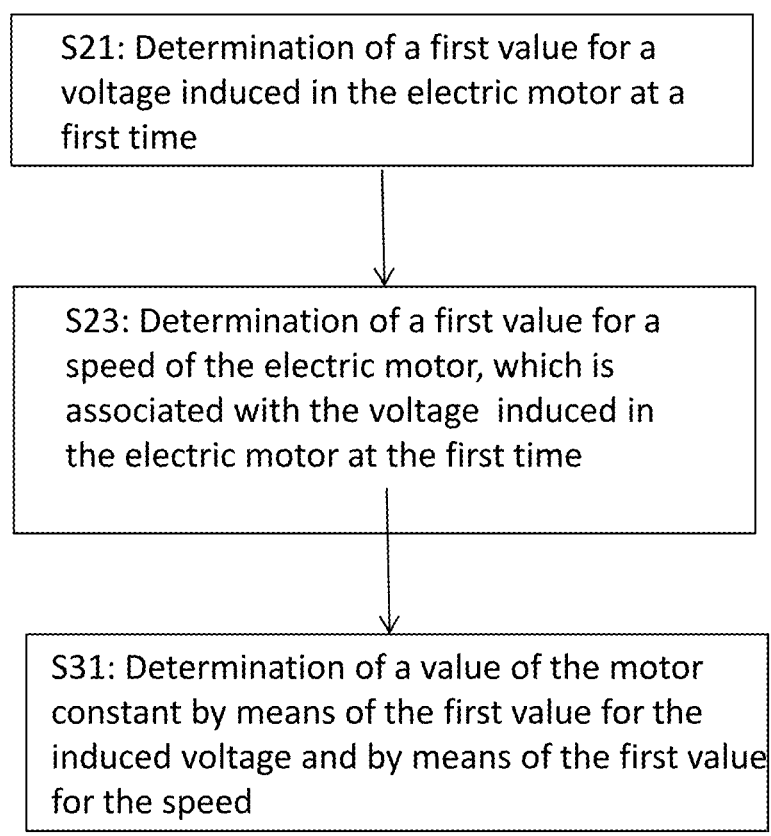
FIG. 3 shows schematically the method sequence of an embodiment of the method shown in FIG. 2.

In FIG. 3 an embodiment of the method from FIG. 2 is depicted schematically. Step S1 corresponds to step S1 in FIG. 2. Step S2 from FIG. 2 is divided into two steps S21 and S23 in the method according to FIG. 3. In step S21, a first value for a voltage $U_i$ induced in the electric motor is determined at a first time. The induced voltage $U_i$ is determined by a measurement. In step S23, furthermore, a first value for a speed w of the electric motor is determined at the first time. The parameters determined in step S2 of FIG. 2 are thus the induced voltage and the speed. The speed ω can either be calculated by means of a model or determined by a measurement. The measurement can take place by means of a ripple detector, for example. The ripple detector detects the ripple in the motor current signal of the drive motor. The ripple count is a measure of the actuating path covered by the spindle nut. Measurement by means of a motor speed sensor is also possible. A direct measurement of the actuating path of the spindle nut by means of a path sensor is also possible. Starting out from the actuating path, the speed ω of the electric motor can then also be deduced with knowledge of the gear reduction of the transmission.

In step S31, which corresponds to step S3 of the method in FIG. 2, the value for the motor constant $k_m$ is then determined by means of the first value for the voltage $U_i$ induced in the electric motor and the first value for the speed ω of the electric motor. The value for the motor constant $k_m$ specifically results from the quotient between the induced voltage $U_i$ and the speed ω of the electric motor, according to the following equation (1):

$$k_m = U_i/\omega.$$

Between step S23 and step S31 the voltage applied to the electric motor is switched on again and the application process of the brake or the release process of the brake is continued. The time between switching on and switching off of the voltage at the electric motor is typically 30 ms to 50 ms.

In a variant of the embodiment shown in FIG. 3, the motor constant $k_m$ is determined by means of the loss torque $T_0$ of the electromechanical actuator unit and a no-load current. To do this, the no-load current $I_0$ of the electric motor is measured in a step S0, not depicted, before step S1, thus before switching off the voltage applied to the electric motor. Furthermore, after step S23, in addition to the first value for the voltage $U_i$ induced in the electric motor and to the first value for the speed ω of the electric motor, which are determined at the first time, a second value for the voltage $U_i$ induced in the electric motor and a second value for the speed ω of the electric motor are determined at a second time in the steps S25 (induced voltage $U_i$) and S27 (speed ω), which are not depicted. The second time is different from the first time. The second time can be 20 ms after the first time, for example.

After that a difference Δω between the first value and the second value is calculated for the speed ω of the electric motor in a further step. The calculation takes place typically after the voltage applied to the electric motor was switched back on again.

The loss torque $T_0$ of the electromechanical actuator unit is then calculated by means of the mass inertia $J_{Antr.}$ of the electromechanical actuator unit, which is known, the calculated difference Δω between the first value and the second value for the speed ω of the electric motor and the time difference Δt between the first time and the second time. The calculation takes place according to the following equation (2):

$$T_0 = J_{Antr.} * \Delta\omega/\Delta t,$$

Following on from this, the motor constant can be determined by means of the loss torque $T_0$ according to equation (2) and by means of the no-load current determined before step S1. The calculation takes place according to the following equation (3):

$$k_m = T_0/I_0,$$

The value for the motor constant can thus arise according to equation (1) and according to equation (3). Here the determination can be implemented according to equation (3) alternatively to the determination according to equation (1). In this case the calculation of the motor constant according to equation (3) replaces step S31 of FIG. 3, and the electric motor is switched on again after determination of the second value for the induced voltage $U_i$ and of the second value for the speed ω of the electric motor.

However, the determination according to equation (3) can also be carried out additionally following the determination according to equation (1), in order to verify the value determined according to equation (1). In this case the calculation of the motor constant according to equation (3) takes place in addition to the step S31 shown in FIG. 3, in a step S33 (not depicted). Step S31 can be carried out before step S25 or after step S27 together with step S33. The electric motor is switched on again in particular after determination of the second value for the induced voltage (step S25) and of the second value for the speed ω of the electric motor (step S27) and before step S33.

According to another variant, the value for the motor constant can also be determined in a step S35 by means of the second value for the voltage induced in the electric motor and by means of the second value for the speed of the electric motor at a second time determined in steps S25 and S27, according to equation (1). Step S35 can be alternative or additional both to step S31 and to step S33. If step S35 is carried out additionally to step S31 and/or step S33, the differently calculated values for the motor constant can be used for mutual verification. Step S35 can be carried out in particular even before step S33, to be precise in particular after switching on of the voltage applied to the electric motor.

A possible variant of the method as described by means of FIG. 3 is shown in FIG. 4. In step S0 the no-load current $I_0$ is determined. After this, the voltage applied to the electric motor is switched off in step S1. Steps S21, S23 and S31 of FIG. 4 correspond respectively to steps S21, S23 and S31 of FIG. 3. As described above, in step S25 a second value for a voltage induced in the electric motor is then determined at a second time, and in step S27 a second value for a speed of the electric motor is determined, which is associated with the voltage induced in the electric motor at the second time. In step S4, the voltage applied to the electric motor is then switched on again, before in step S33 a value for the motor constant is determined by means of the second value for the induced voltage and by means of the second value for the speed. In a step S5, as described above, the loss torque $T_0$ is determined according to equation (2). Finally, another value for the motor constant can be determined in step S35 by means of $T_0$ and $I_0$ according to equation (3) for verification of step S31 and S33.

Figure 5:
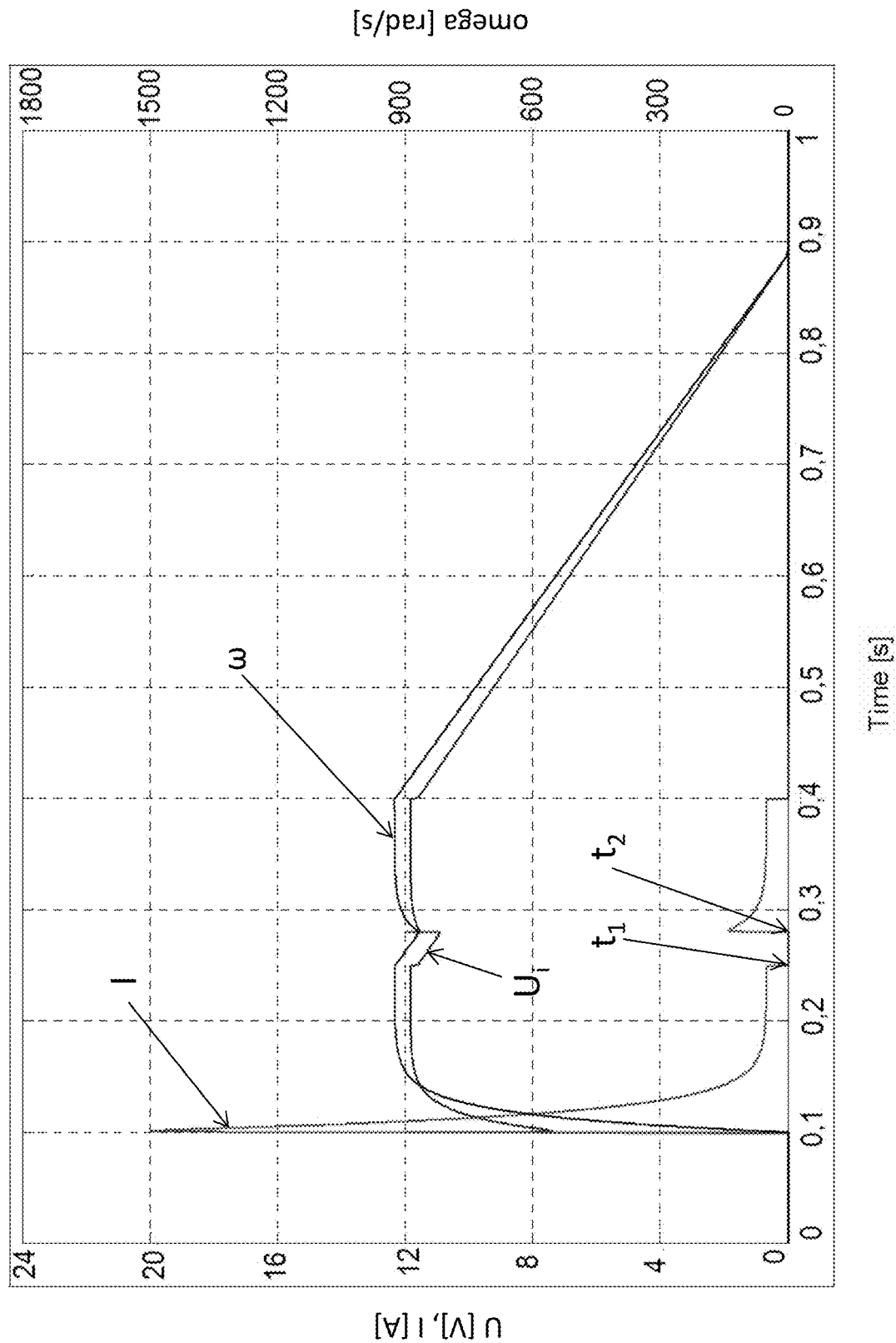
FIG. 5 shows the curve of the electric motor current, of the speed of the electric motor and of the induced voltage as a function of the time during the implementation of the method.

In FIG. 5, the curve of the motor current I, the induced voltage $U_i$ and the speed ω is depicted schematically. If the voltage applied to the electric motor is switched off, no further motor current flows after a short time. This is to be seen in FIG. 5 in a time span $t_2-t_1$ between 0.2 s and 0.3 s, in which the motor current is 0 A. At a first time in this time span $t_2-t_1$, the induced voltage $U_i$ is measured, by means of which a value for the motor constant can be calculated according to equation (1). If a second value for the induced voltage is measured, for verifying the value for the motor constant and/or for calculating the loss torque $T_0$ according to equation (2), this second value is measured at a second time in the time span $t_2-t_1$. After this the motor is switched back on again, so that the motor current rises again to a value different from 0 A, and the braking process or release process is continued.

Figure 6:
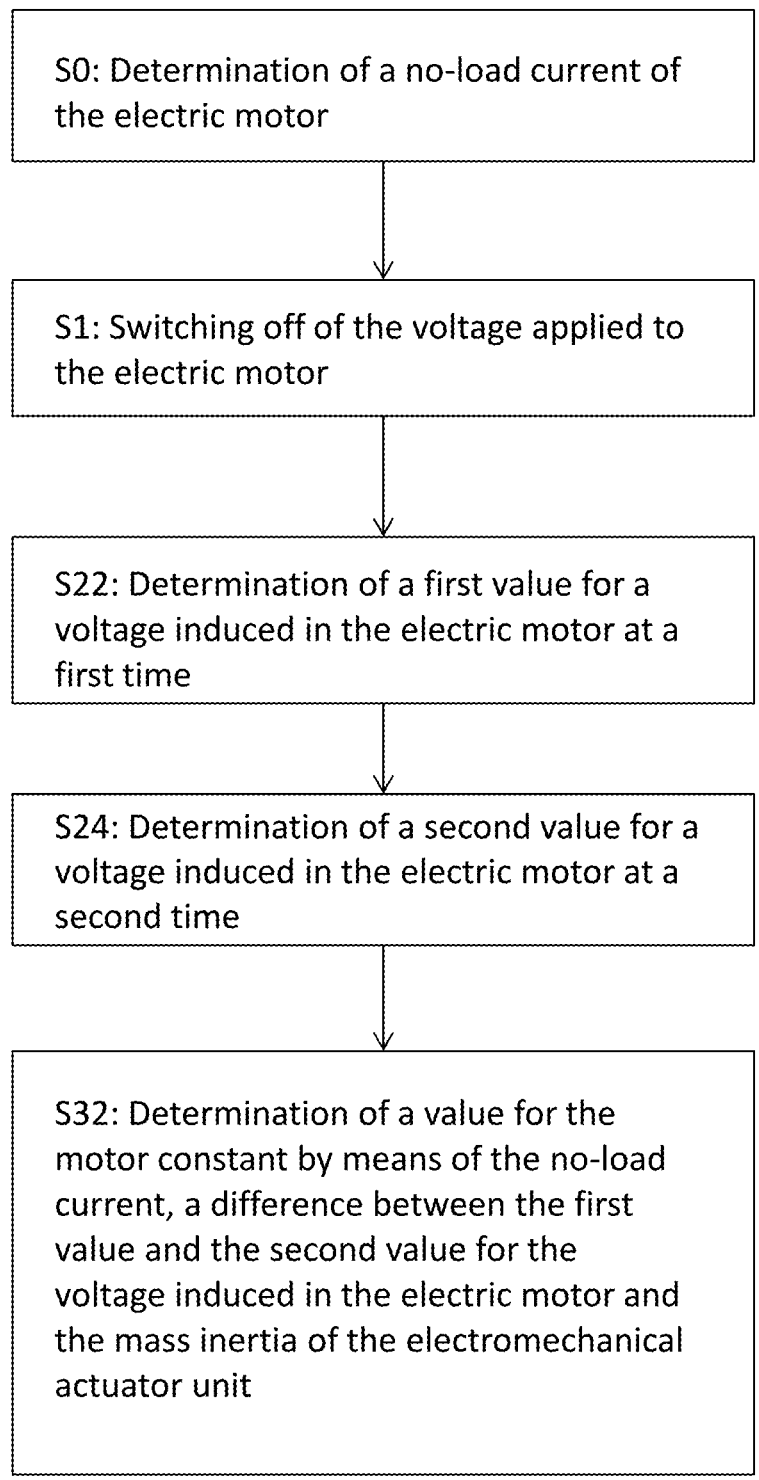
FIG. 6 shows schematically the method sequence of another embodiment of the method shown in FIG. 2.

Another embodiment of the method depicted in FIG. 2 is shown in FIG. 6. In this embodiment of the disclosed method, the motor constant is determined without knowledge of the speed ω of the electric motor. For this the no-load current $I_0$ is required for determining the motor constant. Accordingly, in a first step S0 before the voltage applied to the electric motor is switched off (before step S1), the no-load current $I_0$ of the electric motor is determined in the presence of the idling speed, in particular by measurement. In step S22 a first value is then determined for the induced voltage at a first time, in particular by measurement. In step S24 a second value for the induced voltage is then determined at a second time, in particular by measurement. The first value and the second value are measured after switching off the electric motor voltage, when no further current is flowing, thus in the time span $t_2-t_1$ of FIG. 5. The motor current is then switched on again and the braking or release process resumed. Steps S22 and S24 of FIG. 6 correspond here to step S2 of FIG. 2, wherein the parameter determined in step S2 of FIG. 2 is the induced voltage.

To calculate the motor constant, a difference $\Delta U_i$ between the first value and the second value for the voltage induced in the electric motor is calculated in step S32. Step S32 corresponds to step S3 of FIG. 2. The calculation of the motor constant $k_m$ takes place by means of the following equation (4):

$$k_m = (\sqrt{\Delta Ui} * \sqrt{JAntr.})/(\sqrt{\Delta t} * \sqrt{I0}),$$

wherein $I_0$ is the no-load current of the electric motor, $J_{Antr.}$ is the mass inertia of the electromechanical actuator unit and $\Delta t$ is the time difference between the second time, at which the second value for the induced voltage was measured, and the first time, at which the first value for the induced voltage was measured.

Equation (4) results from equating $\Delta \omega$ from equation (2) and the following equation (5)

$$k_m = \Delta U_i/\Delta \omega,$$

and replacing $T_0$ from equation (2) by $k_m*I_0$ according to the relationship known from equation (3) between $T_0$ and the motor constant $k_m$.

The loss torque $T_0$ can be calculated in the method according to the other embodiment even without knowledge of $\Delta \omega$, according to the following equation (6)

$$T_0 = \sqrt{\frac{\Delta U_i * J_{Antr} * I_0}{\Delta_t}}$$

wherein $\Delta U_i$ is again the difference between the first value and the second value for the induced voltage, $I_0$ is the no-load current, $J_{Antr.}$ is the mass inertia of the electromechanical actuator unit and $\Delta t$ is the time difference between the second time, at which the second value for the induced voltage was measured, and the first time, at which the first value for the induced voltage was measured.

Equation (6) results from equating $k_m$ from equation (3) and equation (5), and replacing $\Delta \omega$ in equation (5) by the relationship known from equation (2).

The disclosed method thus provides several possibilities for determining the motor constant of the electric motor by means of at least one parameter, which is determined or are determined shortly after switching off the electric motor, when no further motor current flows. In the method according to one embodiment, the motor constant is determined among other things by means of the determined speed of the electric motor, in the method according to the other embodiment the motor constant is determined without knowledge of the speed of the electric motor.

Furthermore, the axial three of the spindle nut can be calculated by means of the determined value for the motor constant according to the method disclosed. The motor constant is a parameter that determines the torque of the electric motor as a function of the current flowing in the electric motor. Using the no-load current $I_0$ and the known gear reduction of the transmission, the axial force of the spindle nut can be calculated as a function of the current flowing in the electric motor. It is thus possible to determine the current upon attainment of which the electric motor should be switched off, as the desired clamping force or axial force has been attained. In detail the target switch-off current $I_{Switch-Off}$ results from the following equation (7)

$$I_{Switch-Off} = I_0 + \text{TransmissionRatio}_{Actuator} * F_{CLtarget} * k_m/\eta_{Actuator},$$

wherein $I_0$ is the no-load current, $k_m$ the motor constant, $\text{TransmissionRatio}_{Actuator}$ is the gear reduction of the transmission unit of the electromechanical actuator unit, $F_{CLtarget}$ is the axial force of the spindle nut, at which the electric motor is to be switched off, and $\eta_{Actuator}$ is the efficiency of the electromechanical actuator unit.

The motor constant is a known motor characteristic value, which is, however, temperature-dependent. Furthermore, the motor constant can vary due to manufacturing tolerances in a motor size by +/−10% from motor to motor. Inaccuracies of +/−10% thus arise in calculation of the target switch-off current at a desired clamping force by means of the known motor characteristic value on account of manufacturing tolerances alone. Added to that is the fact that the exact motor temperature is not known, which leads additionally to inaccuracies when calculating the target switch-off current on attaining a desired clamping force.

According to the disclosed method, the motor constant is determined by means of at least one parameter, which is determined during the idling phase in vehicle operation. The determined value for the motor constant thus contains variations on account of manufacturing tolerances and temperature influences. A more accurate clamping force setting is consequently possible than when using a previously known motor characteristic value. This leads to smaller overloads and thus to a longer transmission service life.

According to the disclosed method, the temperature of the electric motor can also be determined by comparing the motor characteristic values determined according to the method with known reference values for the motor constant as a function of the temperature. The known reference values are stored in a memory unit of the vehicle brake, for example. The temperature of the electric motor can thus be determined in a simple manner by means of the determined motor constant without additional sensor.

The disclosed method can be implemented on each actuation of the vehicle brake in parking mode or regularly at defined time intervals on actuation of the vehicle brake in parking mode. By comparing the measured no-load currents $I_0$ and the determined loss torques $T_0$ at known temperatures over time, the efficiency of the electromechanical actuator unit can be inferred. Wear states, for example, can be determined from this. Wear-dependent losses can be compensated for in the switch-off current. The temperatures required for the comparison can have been determined, for example, as described above by comparing the values determined for the motor constant with known reference values for the motor constant.

Since only the voltage is measured when no motor current is flowing, there are no measuring errors either on account of different line resistances and internal motor resistances.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for characterizing an electromechanical actuator unit for a vehicle brake, wherein the electromechanical actuator unit comprises an electric motor and an actuator coupled to the electric motor, wherein the actuator is movable over a first movement range without generating a brake force and over a second movement range with modification of a brake force, and wherein the method is implemented when the actuator is moved within the first movement range and comprises the steps of:
   determining a no-load current of the electric motor;
   switching off a voltage applied to the electric motor;
   determining a first value for a voltage induced in the electric motor at a first time while the electric motor is running in generator mode;
   determining a second value for a voltage induced in the electric motor at a second time while the electric motor is running in generator mode; and
   calculating a motor constant of the electric motor by means of at least multiplying the difference between the first value and the second value by a mass inertia of the electromechanical actuator unit to obtain a multiplication product, and then dividing the multiplication product by the difference between the second time and the first time.

2. The method according to claim 1, wherein the method further comprises the step of:
   switching on the voltage applied to the electric motor, prior to performing the step of calculating the motor constant of the electric motor.

3. The method according to claim 1, wherein the method further the step of:
   determining a value for a loss torque of the electromechanical actuator unit by means of the no-load current, the difference between the first value and the second value for the voltage induced in the electric motor and the mass inertia of the electromechanical actuator unit.

4. The method according to claim 1, wherein the method further comprises the step of:
   determining a temperature of the electric motor by comparing the determined value for the motor constant with previously known reference values for the motor constant, which are each associated with a certain temperature.

5. The method according to claim 1, wherein the method further comprising the step of:
   determining a motor current, at which a previously determined brake force is attained, by means of the determined value for the motor constant.

6. The method according to claim 1, wherein the method can be implemented on movement of the actuator from the first movement range to the second movement range or vice versa.

7. The method according to claim 1, wherein the method is further implemented on each actuation of the vehicle brake.

8. A method for characterizing an electromechanical actuator unit for a vehicle brake, wherein the electromechanical actuator unit comprises an electric motor and an actuator coupled to the electric motor, wherein the actuator is movable over a first movement range without generating a brake force and over a second movement range with modification of a brake force, and wherein the method is implemented when the actuator is moved within the first movement range and comprises the steps of:
   determining a no-load current of the electric motor;
   switching off a voltage applied to the electric motor;
   determining a first value for a voltage induced in the electric motor at a first time while the electric motor is running in generator mode;
   determining a second value for a voltage induced in the electric motor at a second time while the electric motor is running in generator mode; and
   calculating a value for a loss torque of the electromechanical actuator unit by at least multiplying a mass inertia of the electromechanical actuator by both the no-load current and the difference between the first value and the second value to obtain a multiplication product, and then dividing the multiplication product by the difference between the second time and the first time.

9. The method according to claim 8, wherein the method further comprises the step of:
   determining a temperature of the electric motor by comparing the determined value for the motor constant with previously known reference values for the motor constant, which are each associated with a certain temperature.

10. The method according to claim 8, wherein the method further comprises the step of:
    determining a motor current, at which a previously determined brake force is attained, by means of the determined value for the motor constant.

11. The method according to claim 8, wherein the method can be implemented on movement of the actuator from the first movement range to the second movement range or vice versa.

12. The method according to claim 8, wherein the method is further implemented on each actuation of the vehicle brake.

* * * * *